United States Patent
Perumalla et al.

(10) Patent No.: US 12,067,134 B2
(45) Date of Patent: Aug. 20, 2024

(54) SECURE DATA TRANSFER VIA USER-SPECIFIC DATA CONTAINERS

(71) Applicant: International Business Machines Corporation, Armonk, NY (US)

(72) Inventors: Saraswathi Sailaja Perumalla, Visakhapatnam (IN); Raghupatruni Nagesh, Visakhapatnam (IN); Gautam Zalpuri, Boxborough, MA (US); Dan Craig, Audubon, PA (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 17/651,957

(22) Filed: Feb. 22, 2022

(65) Prior Publication Data

US 2023/0267219 A1  Aug. 24, 2023

(51) Int. Cl.
H04L 29/06  (2006.01)
G06F 21/62  (2013.01)

(52) U.S. Cl.
CPC .................................... *G06F 21/62* (2013.01)

(58) Field of Classification Search
CPC ....................................................... G06F 21/62
See application file for complete search history.

(56) References Cited

U.S. PATENT DOCUMENTS

| | | | |
|---|---|---|---|
| 7,072,951 B2 | 7/2006 | Von Klopp | |
| 8,589,947 B2 | 11/2013 | Potter | |
| 9,697,038 B1 | 7/2017 | Havemose | |
| 9,843,533 B2 | 12/2017 | Turovsky | |
| 10,409,566 B2 | 9/2019 | Chen | |
| 11,245,731 B1* | 2/2022 | Guruswamy | H04L 63/105 |
| 2003/0069962 A1* | 4/2003 | Pandya | H04L 69/329 709/224 |
| 2010/0146379 A1 | 6/2010 | George | |
| 2010/0274910 A1* | 10/2010 | Ghanaie-Sichanie | H04L 63/08 709/229 |
| 2019/0220530 A1* | 7/2019 | Motwani | H04L 67/1097 |
| 2020/0267173 A1 | 8/2020 | Ghosh | |
| 2020/0310857 A1* | 10/2020 | Sharma | G06F 9/485 |

OTHER PUBLICATIONS

Andryashin, et al., "Selenoid", Last updated on Nov. 20, 2021, 48 pages, Published by Aerokube, <https://aerokube.com/selenoid/latest/>.

(Continued)

*Primary Examiner* — Jason K Gee
(74) *Attorney, Agent, or Firm* — Gavin Giraud

(57) ABSTRACT

A processor may identify that one or more client-side applications have been initiated. The processor may identify a browser container. The processor may securely run the one or more client-side applications in the browser container. A website server may collect data that is to be transferred to a browser and sent back from the browser, and the browser container may be associated with the browser. The processor may permit a transfer and sending of the data between the website server and the browser. The transfer and sending of the data may include session specific information that is to be cached on a client-side.

20 Claims, 5 Drawing Sheets

(56) References Cited

OTHER PUBLICATIONS

Anonymous, "Facebook. Well contained. Keep the rest of your life to yourself", Downloaded from the internet on Jan. 6, 2022, 4 pages, Published by Mozilla, <https://www.mozilla.org/en-US/firefox/facebookcontainer/>.

Anonymous, "Method for Keeping Track of Browser Screen in Web 2.0 Application Toolkit", Published on Dec. 4, 2010 by IP.com, 5 pages, <https://priorart.ip.com/IPCOM/000202115>.

Anonymous, "Multi-Account Containers", Downloaded from the Internet Jan. 7, 2022, 9 pages, Published by Mozilla, <https://support.mozilla.org/en-US/kb/containers>.

Kinch, K., "Making the Move to Server-Side Tagging—Part 1", Published on Jun. 28, 2021 by Adswerve, 6 pages, <https://adswerve.com/blog/making-the-move-to-server-side-tagging-part-1/>.

Mell, et al., "The NIST Definition of Cloud Computing", Recommendations of the National Institute of Standards and Technology, U.S. Department of Commerce, Special Publication 800-145, Sep. 2011, 7 pgs.

Posnick, et al., "Prevent Unnecessary Network Requests with the HTTP Cache", Published on Nov. 5, 2018 by web.dev, 10 pages, <https://web.dev/http-cache/>.

\* cited by examiner

SECURE DATA TRANSFER VIA USER-SPECIFIC DATA CONTAINERS

BACKGROUND

The present disclosure relates generally to the field of information security, and more specifically to securely transferring user data via user-specific data containers.

Generally, information security teams have focused on securing applications and host servers in enterprise web application, and users are expected to secure their own devices, use anti-virus scanners, etc., and update operating systems/applications/browsers to ensure client-side security.

Additionally, server side application deployment models have begun to switch to container based system usage to deploy applications to public and private cloud servers to ensure consistent, repeatable, and secure deployment across all environments and host servers. This also ensures security due to the deployed image running in the context of a container.

SUMMARY

Embodiments of the present disclosure include a method, computer program product, and system to securely share data. A processor may identify that one or more client-side applications have been initiated. The processor may identify a browser container. The processor may securely run the one or more client-side applications in the browser container. A website server may collect data that is to be transferred to a browser and sent back from the browser, and the browser container may be associated with the browser. The processor may permit a transfer and sending of the data between the website server and the browser. The transfer and sending of the data may include session specific information that is to be cached on a client-side.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
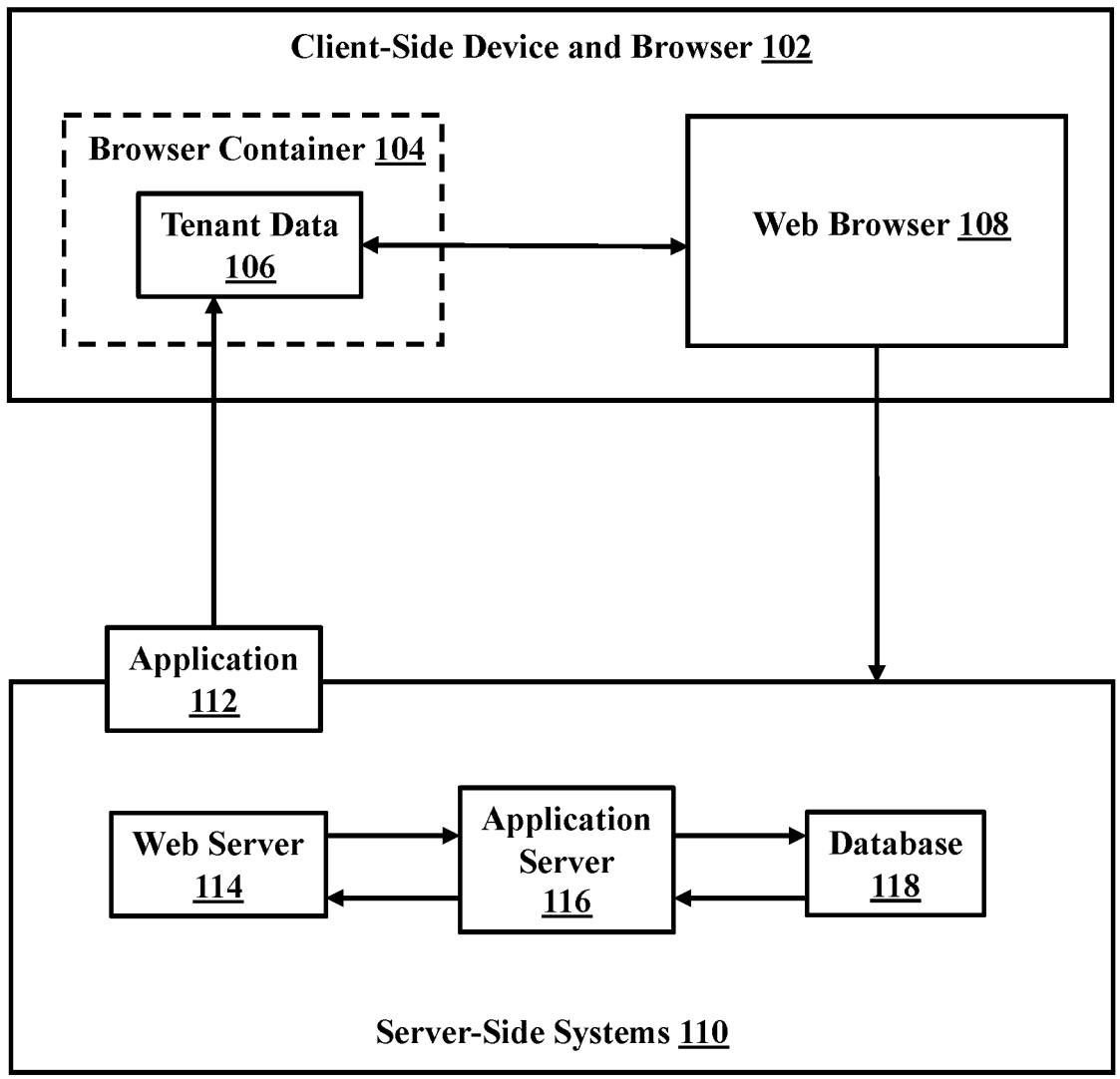
FIG. 1 illustrates a block diagram of an example system to securely share data, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of information security, and more specifically to securely transferring user data via user-specific data containers. While the present disclosure is not necessarily limited to such applications, various aspects of the disclosure may be appreciated through a discussion of various examples using this context.

Generally, information security teams have focused on securing applications and host servers in enterprise web application, and users are expected to secure their own devices, use anti-virus scanners, etc., and update operating systems/applications/browsers to ensure client-side security.

Additionally, server side application deployment models have begun to switch to container based system usage to deploy applications to public and private cloud servers to ensure consistent, repeatable, and secure deployment across all environments and host servers. This also ensures security due to the deployed image running in the context (e.g., application, etc.) of a container.

As such, there is an opportunity to secure client-side applications using browser containers (e.g., containers that run in the context [window, tab, etc.] of the browser on a client machine). This ensures that the data and application run in the context of the container on the browser in isolation. Any relevant data required by the client-side application can be cached on the client device for faster client-side experiences in a secure manner.

Accordingly, disclosed here is an approach/solution to share data from a client to a server securely and with a high degree of isolation on the client-side for a web based application. The proposed solution, via a processor, may securely run the client-side applications in a browser container, or containers. In some embodiments, a website server may collect data that needs to be transferred to the browser and may send it back. This includes, but is not limited to data that needs to be cached on the client-side securely for tenant/user, or session, specific information, user transactions, enable limited searches, perform lookups of read-only data, etc.

In some embodiments, the proposed solution may ensure a user performs transactions on the browser container, thereby making fewer HTTP requests to a web server. The proposed solution may guarantee data state changes on the (web) server, which are already cached on a browser container, or containers, is notified to the container. This can be done using web sockets, or piggybacked along with any transaction responses, depending on the urgency of updating data on the client.

In some embodiments, the proposed solution may not include data that is already available through content delivery networks (CDNs) and other caching mechanisms, but is limited to data that is specifically tied to an authenticated user session. In some embodiments, there may be a possibility for transactions/information exchanges to be partially processed on the client-side using data available in the browser container. This helps speed up overall transaction processing on the server/server side, and reduces load on the server when processing concurrent transactions from multiple users.

In some embodiments, the browser container may isolate user data from other browser sessions that the user may have open. In some embodiments, the application may run inside the browser containers and serve the user actions/requests from the containers itself; the proposed solution is inherently scalable and its highly available and reliable by sending request to browser containers.

Accordingly, web applications built by can be designed with enhanced end-to-end isolation and security with this proposed solution. Some of the benefits of the proposed solution are that:

There can be a "lift and shift" of existing server side tenant data into browser container architectures. This reduces bandwidth consumption; therefore, it decreases network traffic and diminishes network congestion;

There can be a reduction in the workload of a remote web server by spreading the data widely among the browser containers:

There can be complete isolation of an application inside a browser container from other applications; and Systems are enabled to be easily scalable as tenant data is maintained at a client-side, which is completely isolated from the user and other application, and the client-side also secure.

Referring now to FIG. 1, illustrated a block diagram of an example system 100 to securely share data, in accordance with aspects of the present disclosure. As depicted, the system 100 includes a client-side device and browser 102, which includes a browser container 104 with tenant data 106 (which could be user data), and a web browser 108. The system 100 further includes server-side systems 110, which includes an application 112, a web server 114, an application server 116, and a database 118.

As a general example for the system 100, browser container 104 in the client-side device and browser 102 is used. The system 100 then assumes that the browser container 104 (and associated tenant data 106) will eventually become mainstream, and offers access to be controlled to a limited degree by the application 112 (e.g. to request that application 112 always runs in a separate container).

In some embodiments, the system 100 creates a cached copy of all tenant (specific) data 106 in a server container, which could be in the server-side systems 110. In some embodiments, the system 100 forces the application 112 to run in the browser container 104 (e.g., the web browser 108 sets up a container to run one application in isolation) and commands from the server-side systems 110 (e.g., web server 114, application server 116, etc.) to the web browser 108 requesting browser container 104 mode to be established.

In some embodiments, the system 100 sends view model specific data to the web browser 108. In some embodiments, a user session controls the lifetime of the browser container 104. In some embodiments, when dealing with shared devices, the browser container 104 is tied to user credentials/ user specific data.

In some embodiments, secure logging and application tracing on the client-side device and browser 102 is possible when the application 112 requires debugging. In some embodiments, due to the browser container 104, client-side attack vectors that common today are eliminated to a high degree.

Turning to another example in regard to the system 100 of FIG. 1, the system 100 will identify from the server-side systems 110, that the application 112 is trying to interact/ initiated with the client-side device and browser 102. The application 112 may be associated with, and/or utilize information from, the web server 114, the application server 116, and the database 118. In some embodiments, the application 112 may be a client-side (initiated) application.

In some embodiments, upon the identifying the interaction/initiation of the application 112, the system 100 generates, or identifies the browser container 104, where application data is loaded and cached in the browser container 104. In some embodiments, the loaded and cached data is interacted with the tenant data 106, which may be data specific to a user/tenant of the client-side device and browser 102. In some embodiments, the tenant data 106 may be associated with/interacted with information provided by the web browser 108.

In some embodiments, an HTTP request is sent by the web browser 108 if data/information is not present in the browser container 104 or if transactional data is needed to be flushed to the server-side systems 110. Again, due to the user of the browser container 104, data on the client-side device and browser 102, is secure.

Figure 2:
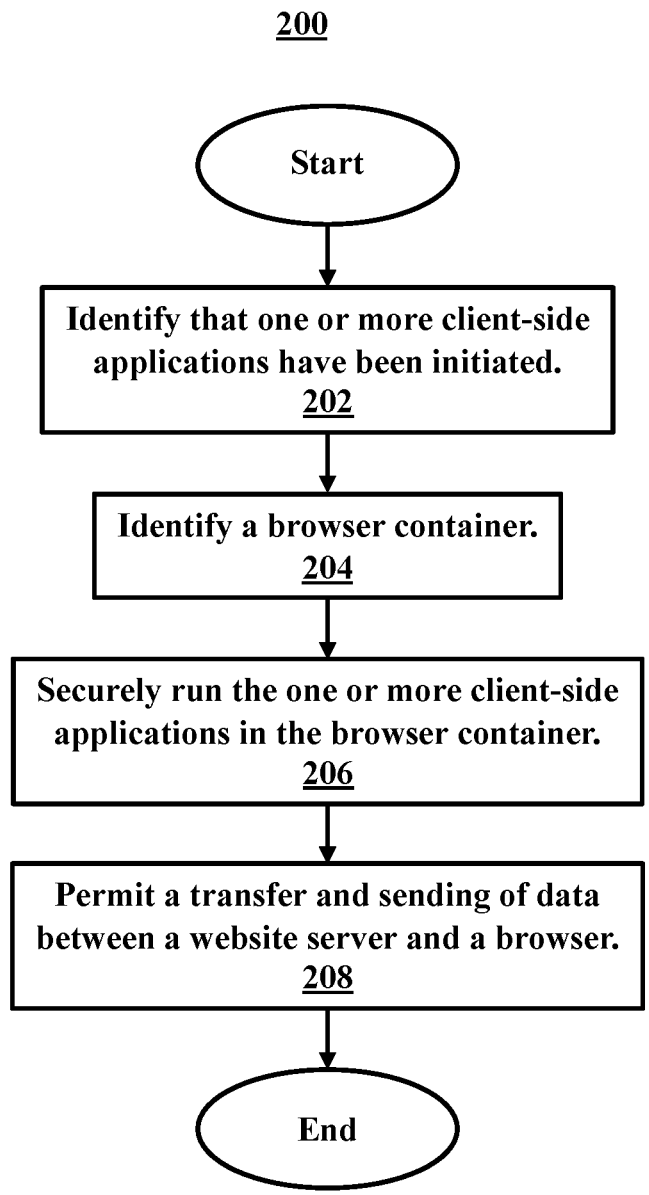
FIG. 2 illustrates a flowchart of an example method to securely share data, in accordance with aspects of the present disclosure.

Referring now to FIG. 2, illustrated is a flowchart of an example method 200 to securely share data, in accordance with aspects of the present disclosure. In some embodiments, the method 200 may be performed by a processor (e.g., of system 100 of FIG. 1, etc.).

In some embodiments, the method 200 begins at operation 202, where the processor identifies that one or more client-side applications, or applications, have been initiated. In some embodiments, the method 200 proceeds to operation 204, where the processor identifies, or generates, a browser container.

In some embodiments, the method 200 proceeds to operation 206, where the processor securely runs the one or more client-side applications (or data of/associated with the applications) in the browser container. In some embodiments, a website server collects data that is to be transferred to a browser and sent back from the browser. In some embodiments, the browser container is associated with the browser, or is generated for use with the browser.

In some embodiments, the method 200 proceeds to operation 208, where the processor permits a transfer and sending of the data between the website server and the browser. In some embodiments, the transfer and sending of the data includes session specific information that is to be cached on a client-side.

In some embodiments, discussed below, there are one or more operations of the method 200 not depicted for the sake of brevity and which are discussed throughout this disclosure. Accordingly, in some embodiments, the processor may confirm that a user performs interactions on the browser container. In some embodiments, the confirmation ensures fewer Hypertext Transfer Protocol (HTTP) requests to the website server.

In some embodiments, the processor notifies the browser container of data state changes on the website server. In some embodiments, the data is already cached on the browser container. In some embodiments, the data is specifically tied to an authenticated user session In some embodiments, the processor may partially process, the data on the client-side while in the browser container. In some embodiments, the partial processing reduces load on the web(site) server. In some embodiments, the browser container may isolate user data from other browser sessions that the user has opened. In some embodiments, user requests associated with the one or more client-side applications may be from the browser container itself, accordingly, the processor may increase reliability of user request processing by sending the user requests to the browser container.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
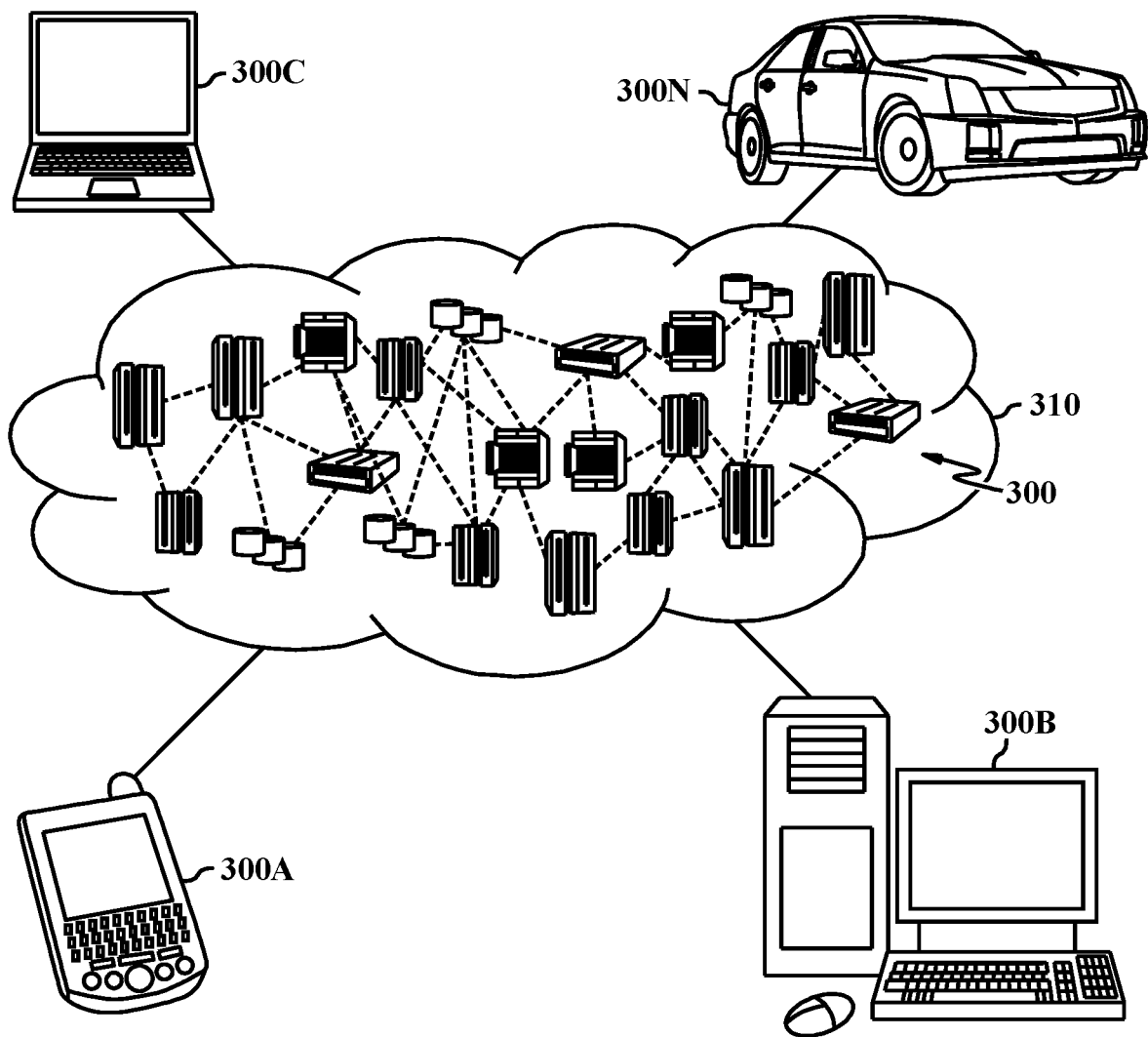
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
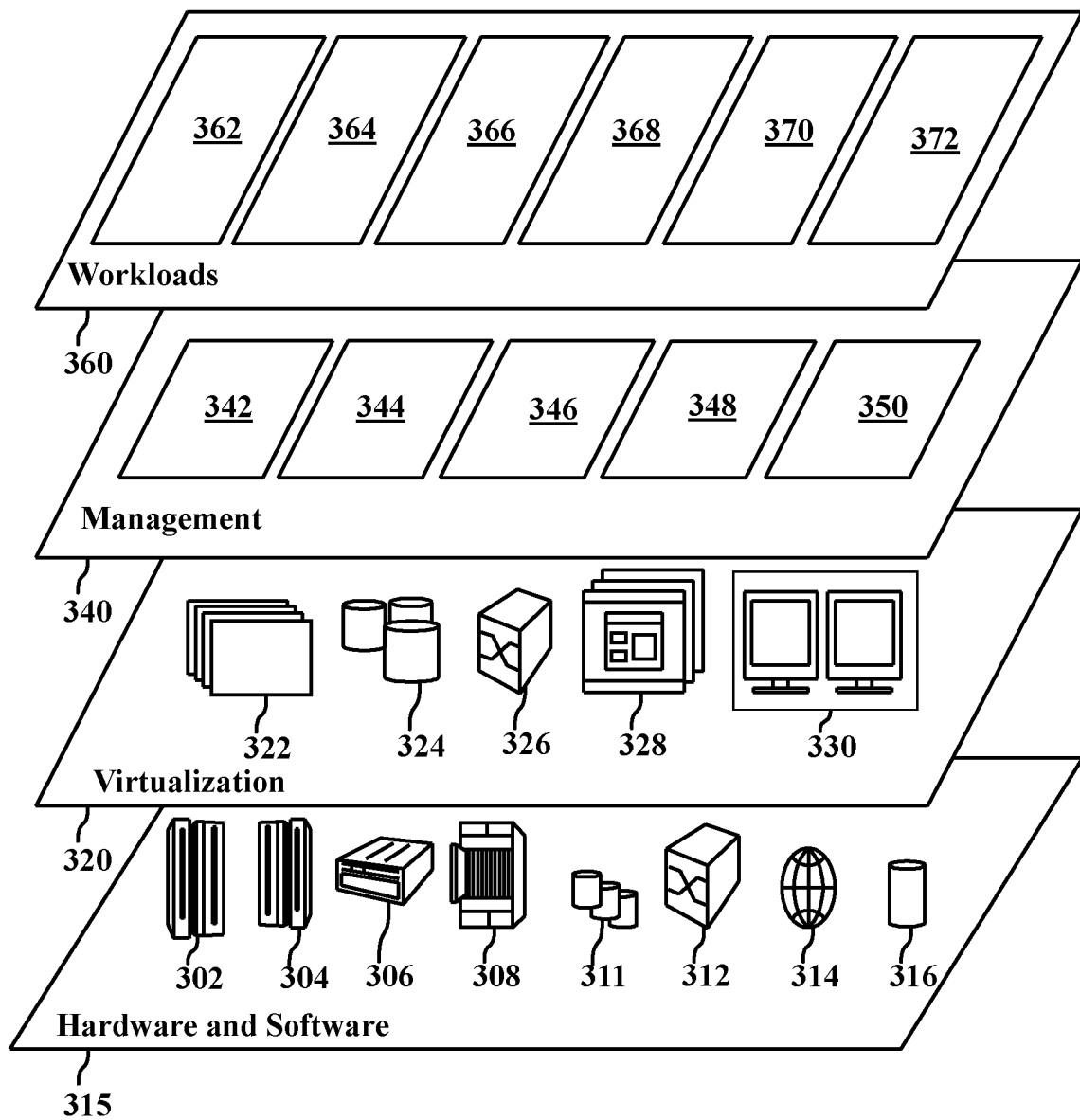
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and secure data sharing 372.

Figure 4:
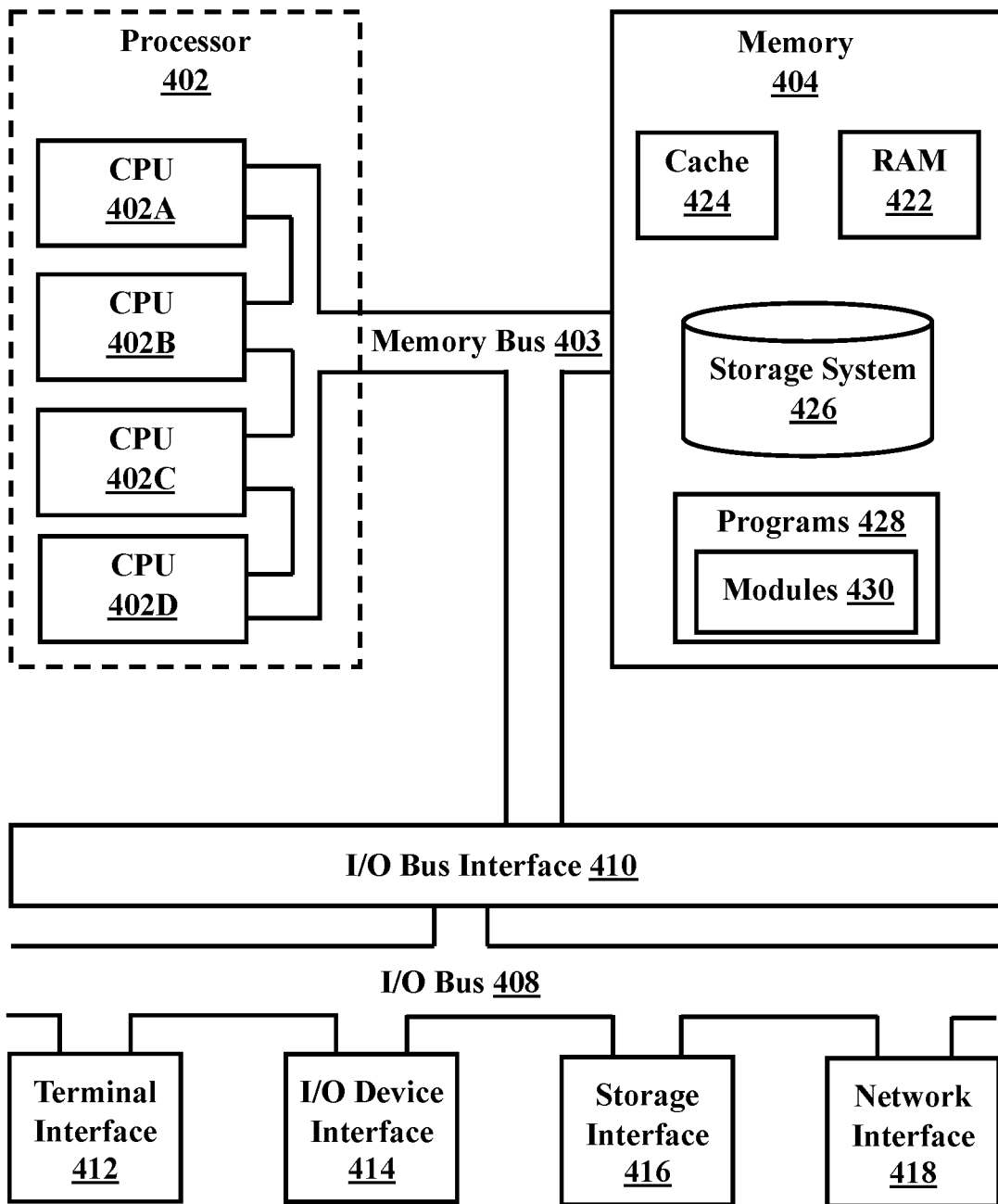
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system to securely share data, the system comprising:
a memory; and
a processor in communication with the memory, the processor being configured to perform operations comprising:
identifying that one or more client-side applications have been initiated;
identifying a browser container;
running, securely, the one or more client-side applications in the browser container, wherein a website server collects tenant data, comprising data that is authenticated by a specific user with information for a specific session, wherein the data is to be transferred to a browser and deleted from the website server, and wherein the browser container is associated with the browser; and
permitting a transfer and sending of the tenant data from the website server to the browser, wherein the tenant data is i) to be cached on a client-side that is isolated from other applications and ii) runs isolated from the website server.

2. The system of claim 1, wherein the processor is further configured to perform operations comprising:
confirming that a user performs interactions on the browser container, wherein the confirmation ensures fewer Hypertext Transfer Protocol (HTTP) requests to the website server.

3. The system of claim 1, wherein the processor is further configured to perform operations comprising:
notifying the browser container of data state changes on the website server, wherein the data is already cached on the browser container.

4. The system of claim 1, wherein the data is specifically tied to an authenticated user session.

5. The system of claim 1, wherein the processor is further configured to perform operations comprising:
processing, partially, the data on the client-side while in the browser container, wherein the partial processing reduces load on the website server.

6. The system of claim 1, wherein the browser container isolates user data from other browser sessions that the user has opened.

7. The system of claim 1, wherein user requests associated with the one or more client-side applications are from the browser container itself, and wherein the processor is further configured to perform operations comprising:
increasing reliability of user request processing by sending the user requests to the browser container.

8. A computer-implemented method to securely share data, the method comprising:
identifying, by a processor, that one or more client-side applications have been initiated;
identifying a browser container;
running, securely, the one or more client-side applications in the browser container, wherein a website server collects tenant data, comprising data that is authenticated by a specific user with information for a specific session, wherein the data is to be transferred to a browser and deleted from the website server, and wherein the browser container is associated with the browser; and
permitting a transfer and sending of the tenant data from the website server to the browser, wherein the tenant data is i) to be cached on a client-side that is isolated from other applications and ii) runs isolated from the website server.

9. The computer-implemented method of claim 8, further comprising:
confirming that a user performs interactions on the browser container, wherein the confirmation ensures fewer Hypertext Transfer Protocol (HTTP) requests to the website server.

10. The computer-implemented method of claim 8, further comprising:
notifying the browser container of data state changes on the website server, wherein the data is already cached on the browser container.

11. The computer-implemented method of claim 8, wherein the data is specifically tied to an authenticated user session.

12. The computer-implemented method of claim 8, further comprising:
processing, partially, the data on the client-side while in the browser container, wherein the partial processing reduces load on the website server.

13. The computer-implemented method of claim 8, wherein the browser container isolates user data from other browser sessions that the user has opened.

14. The computer-implemented method of claim 8, wherein user requests associated with the one or more client-side applications are from the browser container itself, and wherein the method further comprises:
increasing reliability of user request processing by sending the user requests to the browser container.

15. A computer program product to securely share data comprising a computer readable storage medium having program instructions embodied therewith, the program instructions executable by a processor to cause the processor to perform operations, the operations comprising:
identifying that one or more client-side applications have been initiated;
identifying a browser container;
running, securely, the one or more client-side applications in the browser container, wherein a website server collects tenant data, comprising data that is authenticated by a specific user with information for a specific session, wherein the data is to be transferred to a browser and deleted from the website server, and wherein the browser container is associated with the browser; and
permitting a transfer and sending of the tenant data from the website server to the browser, wherein the tenant data is i) to be cached on a client-side that is isolated from other applications and ii) runs isolated from the website server.

16. The computer program product of claim 15, wherein the processor is further configured to perform operations comprising:
    confirming that a user performs interactions on the browser container, wherein the confirmation ensures fewer Hypertext Transfer Protocol (HTTP) requests to the website server.

17. The computer program product of claim 15, wherein the processor is further configured to perform operations comprising:
    notifying the browser container of data state changes on the website server, wherein the data is already cached on the browser container.

18. The computer program product of claim 15, wherein the data is specifically tied to an authenticated user session.

19. The computer program product of claim 15, wherein the processor is further configured to perform operations comprising:
    processing, partially, the data on the client-side while in the browser container, wherein the partial processing reduces load on the website server.

20. The computer program product of claim 15, wherein the browser container isolates user data from other browser sessions that the user has opened.

* * * * *